United States Patent [19]

Strong et al.

[11] Patent Number: 5,689,688

[45] Date of Patent: Nov. 18, 1997

[54] PROBABILISTIC ANONYMOUS CLOCK SYNCHRONIZATION METHOD AND APPARATUS FOR SYNCHRONIZING A LOCAL TIME SCALE WITH A REFERENCE TIME SCALE

[75] Inventors: Hovey Raymond Strong; Edward Leo Wimmers, both of San Jose, Calif.

[73] Assignee: International Business Machines Corporation, Armonk, N.Y.

[21] Appl. No.: 153,332

[22] Filed: Nov. 16, 1993

[51] Int. Cl.$^6$ ........................................ G06F 1/14
[52] U.S. Cl. ........................... 395/553; 395/200.19
[58] Field of Search ......................... 395/550, 182.1

[56] References Cited

U.S. PATENT DOCUMENTS

| | | | |
|---|---|---|---|
| 2,986,723 | 5/1961 | Darwin et al. | 340/147 |
| 3,940,558 | 2/1976 | Gabbard et al. | 178/69.5 R |
| 4,142,069 | 2/1979 | Stover | 179/15 BS |
| 4,305,045 | 12/1981 | Metz et al. | 331/1 A |
| 4,584,643 | 4/1986 | Halpern et al. | 364/200 |
| 4,677,614 | 6/1987 | Circo | 370/86 |
| 4,709,347 | 11/1987 | Kirk | 364/900 |
| 4,736,393 | 4/1988 | Grimes et al. | 375/107 |
| 4,860,285 | 8/1989 | Miller et al. | 370/100 |
| 4,893,318 | 1/1990 | Potash et al. | 375/109 |
| 4,918,652 | 4/1990 | Bennington et al. | 364/900 |
| 4,939,752 | 7/1990 | Literati et al. | 375/107 |
| 4,982,185 | 1/1991 | Holmbert et al. | 340/825.21 |
| 4,988,989 | 1/1991 | Goto | 340/825.21 |
| 5,001,730 | 3/1991 | Franaszek et al. | 375/107 |
| 5,052,029 | 9/1991 | James et al. | 375/107 |
| 5,327,468 | 7/1994 | Edblad et al. | 375/107 |
| 5,550,873 | 8/1996 | Dolev et al. | 375/354 |

FOREIGN PATENT DOCUMENTS

| | | | |
|---|---|---|---|
| 63-084228 | 4/1988 | Japan | H04L 11/00 |
| 02118868 | 5/1990 | Japan | G06F 15/16 |

OTHER PUBLICATIONS

Cristian, IBM Tech. Disclosure Bulletin, vol. 31, No. 2, Jul. 1988 Probabilistic Clock Synchronization.

Cristian, Dolev and Strong, IBM Technical Disclosure Bulletin, vol. 33, No. 8 Jan. 1991, Decentralizing Technique Applied to Master-Slave Clock Synchronization.

Dolev, Halpern, Simons and Strong, Dynamic Fault-Tolerant Clock Synchronization, RJ 8576 (77355) Jan. 16, 1992.

*Primary Examiner*—Dennis M. Butler
*Attorney, Agent, or Firm*—James C. Pintner

[57] ABSTRACT

A method is provided for synchronizing local times, maintained at nodes within a network architecture, with a reference time. A node according to the invention can synchronize its local time with the reference time source either actively or in a passive, or eavesdropping, manner. Which of the two manners is to be used preferably depends on whether the node's error exceeds a threshold, and whether the node receives an unsolicited burst of synchronization messages. The active manner is preferably a handshaking scheme, such as probabilistic clock synchronization, in which synchronization is initiated by a request from a node requiring synchronization, and a handshaking exchange of messages between the node and the reference time source establishes a temporal relationship, from which the node produces a synchronized time and a maximum error. The passive manner is preferably a manner in which the reference time source broadcasts a burst of reference-time-stamped synchronization messages, and the node eavesdrops on the messages. The receiving node establishes temporal relationships between certain ones of the local and reference time stamps. Using the temporal relationships, the receiving node updates its local time and its maximum error.

36 Claims, 4 Drawing Sheets

PROBABILISTIC ANONYMOUS CLOCK SYNCHRONIZATION METHOD AND APPARATUS FOR SYNCHRONIZING A LOCAL TIME SCALE WITH A REFERENCE TIME SCALE

FIELD OF THE INVENTION

The invention generally relates to the field of network architecture and administration. More specifically, the invention relates to synchronization of internal times maintained by network nodes to a reference time source.

BACKGROUND OF THE INVENTION

In many applications, computers and processors maintain some form of real time for reference and sequencing purposes, and for the purpose of synchronization of activities with other computers or processors. In particular, in network and multiprocessing architectures, time synchronization between network nodes is important.

Generally, such devices maintain a register or other hardware or software structure which contains a representation of real time. This time representation can be either a literal time (such as Universal Time, Greenwich Mean Time, Eastern Standard Time, etc.) or some suitable form of logical time. In either case, the device maintaining the time representation updates the time internally on a real time basis. For instance, a processor might have a hardware timer which provides an interrupt at a known real time interval, measured in terms of system hardware clock cycles. Responsive to the interrupt, the processor updates its internal time in accordance with the known real time interval between interrupts.

In addition to maintaining and updating time internally, a processor or network node synchronizes its internal time with an external reference time source. A processor which has been synchronized to an external time source measures time in accordance with its internal hardware clock, which operates at a known frequency. Since the hardware clock frequency is inevitably not perfectly accurate, as time goes by the internal time maintained by a processor diverges from the external time with which the processor was previously synchronized. This time divergence is sometimes called "clock drift". Typically the processor's time drifts linearly from the external time. To prevent the clock drift from getting too large, from time to time the processor resynchronizes its internal time with the external reference time.

Various arrangements may be used for providing a reference time source. For instance, in a network comprising a plurality of nodes, one of the nodes serves as a repository of a reference time. All other nodes of the network are synchronized with that node's time.

Another time synchronization method involves reception of a reference time from a time source external to the network. Time services exit, which provide accurate time information for various purposes, including computer or network synchronization. One well known time source is WWV, which broadcasts a Universal Time signal. WWV and other similar time sources may be used to provide time synchronization to computers and processors. As described above, a processor which is synchronized with such a time source gradually drifts out of synchronization. Also, time sources such as WWV occasionally introduce "leap seconds" to synchronize their time with the motions of the planet Earth. To prevent error from accumulating due to drift and leap seconds, it is particularly desirable that a processor synchronize itself with an external time source from time to time in the normal course of its operation.

In architectures in which a predetermined node is a reference time source, or in which an external reference time source, such as a subscription time service, is coupled through a suitable communication link or interface to a predetermined node of a network, the predetermined node may be characterized as a master node.

In order for the master node to synchronize other nodes, the master node conventionally must know which other nodes it is responsible for updating, so that it can direct appropriate time update messages to those nodes. The master node sends synchronization messages to other nodes coupled to the network, which are slave nodes relative to the predetermined node. In addition, to guarantee that the slave nodes are properly updated, the master node must receive responses from each of the slave nodes. In this scenario, a handshaking scheme is employed between each slave node and the master node, in which a message is sent and then an acknowledgement is awaited. A handshaking scheme is also employed if a slave node sends a synchronization request message to the master node, and the master node responds by sending n synchronization message.

The inaccuracy of time provided to a slave node in these scenarios is related to the total elapsed time for the handshaking sequence of messages. This inaccuracy is thus likely to be undesirably large, particularly if each slave receiving a synchronization message must separately acknowledge it. This large message overhead slows down the response time of the master node to each individual slave node.

A technique called Probabilistic Clock Synchronization (PCS) has been used for synchronizing internal times of nodes with reference time from a designated reference node or from an external source. The technique is described in Cristian, "Probabilistic Clock Synchronization", IBM Technical Disclosure Bulletin, Vol. 31, No. 2 (July 1988), p. 91. A slave node sends a synchronization request at a time t, according to its clock. A master responds with a message giving a time T, according to the master's time clock. The slave receives the response at a time t', according to its clock. It is thus established that the master's time T falls somewhere within the time interval between the slave's times t and t'. The slave then updates its internal time in accordance with a difference between the reference time T and an internal time halfway between t and t'. The slave node's synchronization is accurate to within $$\frac{t'-1}{2}.$$

If desired, this exchange is repeated to provide a plurality of time intervals with which the above method can be used to synchronize the slave node. If the shortest of these intervals is used, the precision of synchronization is improved.

Thus, the probabilistic clock synchronization technique described in Christian advantageously provides both synchronization and a quantitative estimation of the accuracy of synchronization, i.e., an upper bound of synchronization error. However, because this technique uses a handshaking protocol for providing synchronization intervals to slave nodes on an individual basis, it has the drawback that the nodes must have knowledge of each other's IDs. Thus, the scheme is not well equipped to deal with nodes coming on line or going off line, or changes in network configuration, because the master node must be informed of these conditions and must integrate them into its records of the network configuration so that it will know which slave nodes it must communicate with.

Probabilistic clock synchronization is also not well equipped to deal with multiple (redundant) external time sources, which are often present in large architectures including several linked networks. Additionally, while the bidirectional message protocol is simple, it requires a substantial amount of processing overhead. This is particularly true for the reference time source, which must go through the synchronization protocol for each slave node for which the master is responsible.

Another example or a conventional network time synchronization scheme is given in U.S. Pat. No. 5,001,730, issued to Franaszek et al, titled "Clock Synchronization Algorithm for Address Independent Networks". Each node in a network maintains an internal time, and keeps track of when a known time interval has elapsed. The node sends a synchronization message based on its internal time at one end of the interval, unless, prior to the end of the interval, it has received a synchronization message already sent from another node. Therefore, each time the known interval elapses, the nodes resynchronize. Often, after the first three or four resynchronizations, the network reaches a steady state in which one of the nodes, having the fastest internal clock, always sends the synchronization message.

In Franaszek, the precision with which each node synchronizes itself is a value given by an expression which takes into account an upper and lower bound of accuracy of the node's internal clock frequency and an upper and lower bound of a delay during which the message is transmitted from one node to another and is processed by the other node. Thus, the Franaszek arrangement has the drawback that its processing time, which might include a considerable delay due to other tasks being active at the time the synchronization message is received, increases the upper bound of inaccuracy of synchronization to produce an undesirably large value.

In a co-pending patent application by Dolev et al.. Ser. No. 07/970,666, filed Nov. 3, 1992, titled "Anonymous Time Synchronization Method," there is disclosed a clock synchronization method which improves on the precision obtainable by the Franaszek method. The Dolev et al. application is incorporated by reference, but certain details will be summarized here.

Bursts of synchronization messages containing reference time stamps are broadcast over a network or communication link according to a predetermined protocol. A preferred protocol limits tile number of messages in transit at any given time to a known value k.

A node to be synchronized receives and time stamps the messages. Thus, times according to a first time scale and a second time scale are obtained, and the protocol defines temporal relationships between certain ones of the times. That is, as of the time a given message is received and given a local time stamp mark, only k subsequent messages can be in transit. As a consequence, the (k+1)th subsequent message cannot yet have been broadcast. When the (k+1)th message is ultimately received, it is established with certainty that its reference time stamp is later in time than the local time stamp mark assigned to the given message.

In accordance with this predetermined protocol, the node determines a difference between a first time according to one of the time scales and a time related to second and third times according to the other time scale. For instance, the first time is the local time stamp mark of the given messages, and the second and third times are the reference time stamps of the given and (k+1)th messages. If the same formula as given above in the discussion of probabilistic clock synchronization is used, the related time is halfway between the second and third times. The node then updates its local time based on the difference between the first time and the related time.

This synchronization method provides a well-defined upper bound of synchronization error, related to the time difference between the second and third times. It also allows the nodes receiving the messages to synchronize their internal times based only on information contained in the received messages and their internally generated local time stamp marks. Therefore, no "round trip" or handshaking messages are necessary to define the needed temporal relationships between the times according to the first and second scales. As a consequence, it is not necessary that the reference time source know the identities of the nodes which synchronize themselves based on the messages. This anonymity is an advantageous feature of the Dolev et al. method.

The synchronized node also maintains a global precision value, which estimates its time synchronization error, by resetting the value when the node is synchronized, and updating the value as the node operates. Responsive to the global precision exceeding various thresholds, the node requests resynchronization or sends synchronization messages based on its internal time.

Anonymous clock synchronization potentially provides greater accuracy. i.e., a smaller error bound, than probabilistic clock synchronization, because a node receiving the burst of synchronization messages can select from different time intervals between messages of the burst, and select the interval which provides for the best accuracy. Moreover, because the reference time source is not busy supporting separate handshaking protocols between itself and separate slave nodes, the interval between the second and third times is likely to be smaller than would be the case in probabilistic clock synchronization.

On the other hand, there is a possibility that the best error bound obtainable from a burst of messages may not be as good as the error bound that could be obtained from the handshaking method in probabilistic clock synchronization in the optimal case where the reference time source is exchanging messages with a given slave node, and is not encumbered with other processing or communication overhead.

In one preferred embodiment of the Dolev et al. method, a handshaking scheme is used, in which a designated node sends the reference time source acknowledgement messages for each of the synchronization messages in the burst. Note, however, that anonymity is maintained, since the rest of the nodes do not identify themselves to the reference time source. Also, the burst of messages is broadcast, not directed at any particular node, and the designated node acknowledges the messages of the burst anonymously. However, this handshaking scheme does involve a certain amount of overhead processing, and adds a special level of overhead for the node designated as the respondent.

Another aspect of the Dolev et al. method has to do with the means by which the synchronization process is initiated. Unlike the Franaszek method, in which a node requests resynchronization following a predetermined interval, in the Dolev et al. method a node maintains a measure of the upper bound of its synchronization error, and determines that it needs to be resynchronized if the error bound grows great enough to exceed a threshold value. When this situation occurs, the node sends an anonymous synchronization request message to the reference time source. Depending on whether, or how quickly, the node receives a burst of synchronization messages, it re-sends the request, requests synchronization from another time source, or assumes the role of reference time source itself.

Thus, it will be seen that anonymous clock synchronization as given in Dolev et al. has advantages over probabilistic clock synchronization in that it employs anonymous broadcast messages, and therefore does not involve handshaking with each slave node. As a consequence, this scheme is well equipped to support changing network configurations, new nodes coming in and existing nodes dropping out or failing, etc.

However, anonymous clock synchronization requires a certain amount of overhead processing, either for the designated respondent or for the nodes relating to what to do in the absence of a response to a synchronization request, which adds to the complexity of operation of the nodes. It would be further advantageous to employ a scheme which avoids these drawbacks.

SUMMARY OF THE INVENTION

It is therefore an object of the present invention to simplify the processing overhead involved in anonymous clock synchronization, while preserving the advantageous anonymity.

It is a further object of the invention to combine the advantages of probabilistic clock synchronization, relating to synchronization with a known upper bound or error and simple acknowledgement protocol, with the low message overhead of anonymous clock synchronization.

To achieve these and other objectives, there is provided in accordance with the invention a method, for use with a communication network including a plurality of slave nodes which maintain respective local time scales and a reference time source which maintains a reference time scale, for synchronizing a local time scale of one of the slave nodes with the reference time scale.

The clock synchronization method according to the invention comprises two independent techniques, to which different method steps apply. In a first step, a node checks for one of two events. The first event is reception of a message over the network which indicates that synchronization activity is taking place between the reference time source and one of the other slave nodes on the network. This detected message could be a synchronization message from reference time source, but since the network is a broadcast medium and the node can receive any network traffic, the detected message will typically be a synchronization request from another slave node.

The second event that can be detected in the first step of the method of the invention is the clock synchronization error reaching a value great enough that the node must seek resynchronization. Typically, the node maintains a precision from its last synchronization, and knows of a well-defined clock drift rate at which the synchronization error increases. Therefore, a preferred way of detecting the great enough value is by comparing the increasing synchronization error with a predetermined error threshold.

Responsive to detection of the synchronization activity between the reference time source and the other node, the method of the invention includes the following additional steps. In a second step, synchronization messages, broadcast from the reference time source responsive to synchronization request messages sent to the reference time source from a second one of the slave nodes, are received. The number of exchanges of request and synchronization messages is at least two, and is related to a predetermined protocol of the network. The fact that two requests are sent is in contrast to standard PCS, which only requires one request and one synchronization message in response. This requirement will be discussed below in connection with the seventh step of the method of the invention. While two requests is a preferred embodiment of the invention, a greater number of requests may also be used. Of these above-discussed messages, the second synchronization request message had been sent by the one of the slave nodes after receipt of the first synchronization message, and the first and second synchronization messages contain respective reference time stamps denoting times related to the times of transmission of the synchronization messages according to the reference time scale.

In a third step, local time stamp marks are associated with the received synchronization messages. The local time stamp marks denote respective events of reception of the synchronization messages according to the local time scale. In accordance with the predetermined protocol, temporal relationships are defined between certain ones of the reference time stamps of the synchronization messages and certain ones of the local time stamp marks.

In a fourth step, first, second, and third times are identified. The first time is one of a local time stamp mark and a reference time stamp from one of the synchronization messages. The second and third times are the other of local time stamp marks and reference time stamp marks from two of the synchronization messages. The first, second, and third times are identified in accordance with the defined temporal relationships between the events denoted by the times, such that the event denoted by the first time falls between the events denoted by the second and third times.

In a fifth step, a difference is determined between the first time and a time related to the second and third times. Finally, in a sixth step, the local time scale is updated to compensate for the difference between the first time and the time related to the second and third times.

Responsive to detection, in the first step, that the local synchronization error has exceeded a threshold, a seventh step of the method of the invention is executed. In the seventh step, the slave node requests resynchronization, in due course receives a synchronization message, sends a second request, and then receives a second synchronzation message. While only one request and synchronization are necessary for pure PCS, the method of the invention includes a second, sequential, request and synchronization message. This is done so that those nodes executing the second through sixth steps receive sufficient messages to establish the required temporal relationships between local and reference times.

A synchronization method in accordance with the invention overcomes the numerous drawbacks associated with the conventional methods described above, while providing advantageous features of both probabilistic and anonymous clock synchronization that previously have not been available together in any single clock synchronization method.

First, the method does not require a separate "round trip" or handshaking message exchange protocol between the reference time source and each node, as is the case with conventional probabilistic clock synchronization. Rather, when a single node performs the exchange protocol with the reference time source, other nodes use the same broadcast messages for their own synchronization. This can be done because the reference time source broadcasts the synchronization messages, and the modified PCS protocol including two synchronization messages provides sufficient messages for the other nodes to use the Dolev et al. anonymous clock synchronization method. Therefore, the anonymity, which is an advantageous feature of the Dolev et al. anonymous clock synchronization method, is preserved for all nodes other than the single node.

Second, the message exchange protocol used between the reference time source and the single node is the same relatively simple protocol as that used in conventional probabilistic clock synchronization. Therefore, the extra message exchange protocol required for the Dolev et al. anonymous clock synchronization method is no longer necessary.

Also, for each node receiving the broadcast synchronization messages, the synchronization is made with respect to the known local time and the received reference time stamp or stamps. As a consequence, an upper bound of inaccuracy of synchronization may be obtained, as is the case with probabilistic or anonymous clock synchronization. The method in accordance with the invention provides the same measurable accuracy of clock synchronization as that given by probabilistic clock synchronization.

The accuracy of the synchronization which may be obtained depends, as do probabilistic clock synchronization and the Dolev et al. method, on the number of synchronization messages sent by the reference time source, and thus, the number of time intervals a slave node has to choose from. The number of synchronization messages is controlled by the number of requests made by the single slave node. However, since only the single slave node is involved in the message exchange protocol, in the normal operating case the present method has, in common with the Dolev et al. method, the advantage of a greatly reduced total message overhead, compared with probabilistic clock synchronization, in which separate messages are sent for separate nodes.

As is the case with the Dolev et al. method, the upper bound of synchronization inaccuracy is obtained in such a way that a processing delay does not increase the inaccuracy of synchronization. The outcome of the step of estimating is the same regardless of the delay.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENTS

Figure 1:
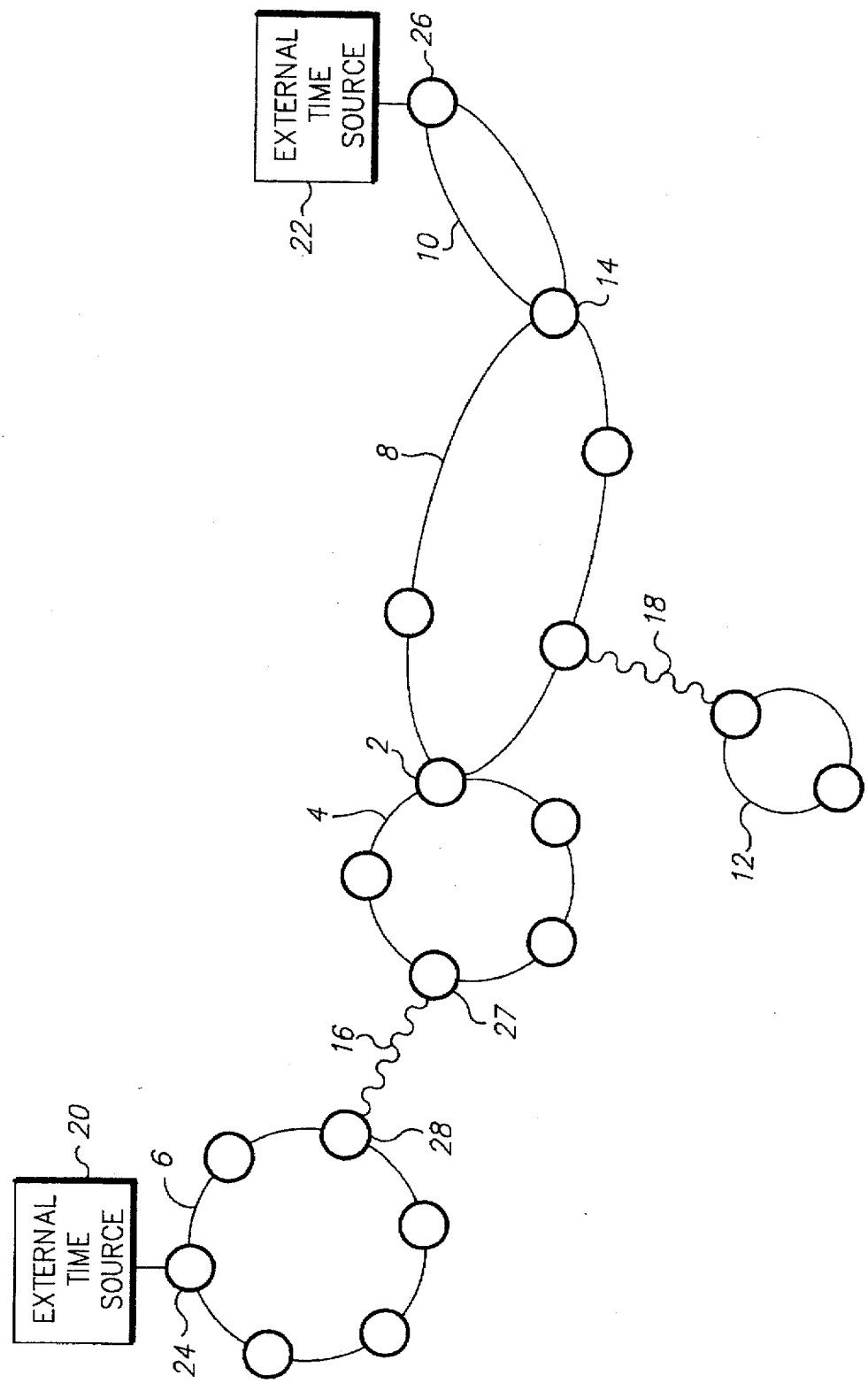
FIG. 1 is a schematic diagram of an exemplary network configuration in which a clock synchronization method in accordance with the invention is employed.

FIG. 1 is a schematic diagram of a communication system employing the time synchronization method according to the invention. A network node 2 is coupled for communication within an architecture including networks 4, 6, 8, 10, and 12. Each of these networks may be an Ethernet, a token ring network, or any other suitable communication network configuration. As shown, the node 2 is a member of the networks 4 and 8. The network 4 is coupled through a communication link 16 to the network 6, the network 8 includes a node 14 which is also a part of the network 10, and the network 8 is coupled to the network 12 through a communication link 18.

Two external reference time sources 20 and 22 are shown. While the time sources 20 and 22 are shown as being separate and distinct, it will be understood that they could both be the same source. For instance, the networks 6 and 10 could both subscribe to the same commercial time source.

The external source 20 is directly coupled to a node 24 in the network 6, and the external source 22 is directly coupled to a node 26 in the network 10. The nodes 24 and 26 synchronize their internal times directly from the respective sources 20 and 22. The nodes 24 and 26 then send synchronization messages to the remaining nodes in the networks 6 and 10, respectively. Nodes which are either coupled to communication links or are members of other networks send synchronization messages thereover. Ultimately, broadcast synchronization messages reach all nodes of all networks of the architecture shown.

This network architecture (FIG. 1) is only one example of a wide variety of architectures which can employ a time synchronization method according to the invention. In other configurations, a given node could be coupled to a single network, or to a plurality of networks limited in number only by the interfacing capacity of the node.

The discussion of the invention which follows will focus on a single network, such as one of the networks 4, 6, 8, and 10 shown in the larger network architecture of FIG. 1. For the purpose of the invention, it is taken as a "given" that there is a reference time source, which could be one of the network nodes. That node is considered to be the master, for the purpose of the invention. The rest of the nodes of the network are considered to be slaves. For instance, in the network 10, the node 26 is a master, and the node 14 is a slave. However, in the network 8, the node 14 is the master. The communication medium is preferably a broadcast medium, so that any node on the network can receive any message sent over the network.

For the purpose of the discussion which follows, the term "reference time source" (RTS) will be used to denote a device which sends synchronization messages over the network. Thus, if the external sources 20 and 22 have the capability of broadcasting synchronization messages, the term "reference time source" shall apply to them. If not, then the term "reference time source" shall refer to the nodes 24 and 26.

According to the method of the invention, a slave node plays one of two roles. The first role is that of the single one of the nodes which participates in a PCS or equivalent handshaking exchange with the reference time source, to cause the reference time source to broadcast two or more synchronization messages. All other nodes of the network play the second role, that of a passive, anonymous recipient of the broadcast messages. Nodes playing the first and second roles will be referred to as "slave nodes." The second role may be thought of as an "eavesdropper" role, while the first role may be thought of as an "active slave" role. If the reference time source is a node, rather than an external source that has the capacity to send and receive messages, then that node will be referred to as a "master node." The role of master node, or reference time source, may be regarded as a third role for a node to play.

A slave node, having the capacity to practice the method of the invention, has the capability of playing either the first or the second role. As long as some other node plays the first role and requests synchronization messages, a given node plays the second role, and synchronizes itself anonymously. Because one objective of the invention is to reduce network traffic for synchronization, it is preferred that a slave node be an eavesdropper. The second role may thus be regarded as a default role. However, if the slave node's error crosses the threshold, it assumes the first role.

The likelihood that nodes of a network will play the first role depends, in part, on their error threshold values. If a node can tolerate a moderately large synchronization error, it will rarely, if ever, assume the first role. A node requiring finer precision will assume the first role more frequently. Thus, in the worst possible case, all slave nodes will assume the first role at about the same time, and for that time interval, the synchronization traffic will be double that if each node were using pure PCS. However, in most realistic situations, most nodes will receive synchronization messages and synchronize themselves anonymously before their errors exceed their thresholds. Thus, the amount of synchronization traffic will be much less.

In accordance with the invention, a reference time source such as a master node synchronizes time for the slave nodes by engaging in an exchange of messages with the first role slave node. The particular criterion used is not an essential part of the invention, but is preferably crossing an error threshold. The first role slave node sends a synchronization request, and the reference time source responds with a synchronization message bearing a reference time stamp, according to the time scale maintained by the reference time source. The first role slave node then sends a second request, and the reference time source response with a second synchronization message bearing a second reference time stamp. This exchange of messages may optionally be continued a desired number of further times, but two synchronization messages, at minimum, are required, for reasons that will be explained in connection with clock synchronization by the slave nodes playing the second role. The first role slave node synchronizes its local time in accordance with PCS.

The synchronization messages sent by the reference time source are broadcast, so that all nodes on the network can receive them. Thus, these synchronization messages are received by the other second role slave nodes and treated as a burst of messages, as is the case with the Dolev et al. method. Each slave, on receipt of a burst of time synchronization messages, synchronizes its internal time based on the time stamps provided in the synchronization messages in a manner described below.

More specifically, a second role slave node synchronizes itself by first performing the step of estimating a local time, that is, a time according to the slave node's time reckoning, which corresponds with a reference time which is determined in relation to the time stamps contained within the received synchronization messages. Then, the second role slave node performs the step of adjusting its local time in accordance with a difference between the estimated local time and the reference time, thereby synchronizing its local time with the reference time.

The step of estimating a local time is done as follows. The slave node maintains local time stamp marks reflecting time from its internal time. Upon receipt of a synchronization message in the node's receive buffer, the node associates a local time stamp mark with the received message, and stores both in a storage buffer. If more than two exchanges of a request and a synchronization message take place between the RTS and the first role node, then a plurality of messages may, from time to time, accumulate in a receive buffer of the slave node. Accordingly, the second role slave node tests the receive buffer after reading a received synchronization message. If the buffer is now empty, the slave node knows that the next synchronization message of the burst has not yet arrived.

Associating the local time with the received message may be done by immediately marking the received message with the current local time, or by inserting a regularly scheduled local time stamp mark with any received messages in a suitable buffer. In the latter case, the node waits until the next regularly scheduled local time stamp mark is generated and then marks the message or messages most recently received with the local time stamp mark before proceeding with the synchronization.

Then, the node determines a difference between one of the time stamp marks and a time related to the reference time stamps from the messages. This is done by identifying two synchronization messages from the burst and one of the local time stamp marks such that the real time at which the local time stamp mark was generated lies between the real time of generation of the reference time stamps in the synchronization messages. Then a difference is calculated between that local time stamp mark and a time related to the reference time stamps contained within those two synchronization messages.

A preferred way of estimating the reference time corresponding with the local time stamp mark in terms of the reference times within the synchronization messages is by splitting the difference between the two. That is, let S be the reference time corresponding with the local time at which the local time stamp mark was made, and let M and T be the reference times contained within the synchronization messages. Then, assuming that the reference time halfway between M and T is used, the reference time S and its upper bound of error are given by the expression $$S = \frac{M+T}{2} \pm \frac{T-M}{2}.$$

Of course, the selected reference time could be anywhere along the continuum between M and T. As long as it is somewhere between M and T, the method according to the invention produces synchronization to within an error bound. However, if the selected reference time is closer to M than T, or vice versa, then the upper bound of synchronization error increases. For instance, if the selected reference time is chosen to be three fourths of the way from M to T, then $$S = M + \frac{3(T-M)}{4} \pm \frac{3(T-M)}{4}.$$

Therefore, it is preferred that the time halfway between M and T is chosen, to minimize the upper bound of synchronization error.

It should be noted, at this point, that the method according to the invention could also be practiced the other way around. That is, instead of determining that a local time (given in the local time stamp mark) falls between two reference times (given in the two synchronization messages), it could also be determined that a reference time given in a synchronization message falls between two local times given in two local time stamp marks.

Thus, the invention may be stated broadly as a method for synchronizing a first time scale with a second time scale, including the step of determining that a first time according to a first time scale falls between second and third times according to a second time scale. The times are selected based on messages sent from a repository of one of the time scales, i.e., a reference time, bearing reference time stamps according to the reference time scale. The messages are received by a local time repository, such as a network node, which associates local time stamps according to the other time scale, i.e., a local time scale.

The messages are transmitted according to a predetermined protocol which is known to the second role slave node. Because of the characteristics of the protocol, temporal relationships are determined between the local time stamp marks and the reference time stamps within the messages. Thus, the first, second, and third times are identified at the node based only on the messages received. The node does not need to send any response messages in order to establish the temporal relationships. Therefore, the messages may be broadcast, and received anonymously by the node.

After the first, second, and third times are identified, a time is selected in relation to the second and third times, preferably halfway between them, and a difference is determined between the selected time and the third time. Finally, the local time is updated to compensate for the difference. Either way, the time synchronization is accurate to within a known value, preferably half of the difference between the second and third times.

The method is preferably practiced as described above, to determine that time synchronization is accurate to within a given upper bound of error. However, the method may also be practiced by using a related time closer to one of the second and third times than to the other, resulting in a larger error bound. Preferably, the second and third times should be as close together as possible, to minimize the error bound. However, the method operates to identify a latest possible second time, and an earliest possible third time. Earlier second times or later third times may be used. In these latter cases, the interval between the second and third times will be larger, leading to a larger error bound, but the temporal relationship will be preserved.

Also, depending on factors such as the type of protocol used for transmission of the messages, the three times may be selected such that there is a high, but not certain, probability that the first time falls between the second and third times. Thus, a lesser accuracy resulting from the high but uncertain probability may be balanced by the likely reduced interval between the second and third times, bringing about a smaller error bound. Preferably, the lesser accuracy should be expressed in quantitative terms, such as a threshold probability value, or a ratio between (i) the time by which the first time falls outside the interval and (ii) the interval itself.

The discussion which follows will focus on an embodiment of the method in which one local time falls between two reference times. However, it will be understood that the method works in essentially the same way if one reference time is determined to fall between two local times.

PROBABILISTIC SYNCHRONIZATION BETWEEN THE REFERENCE TIME SOURCE AND THE SLAVE NODE PLAYING THE FIRST ROLE

Figure 2:
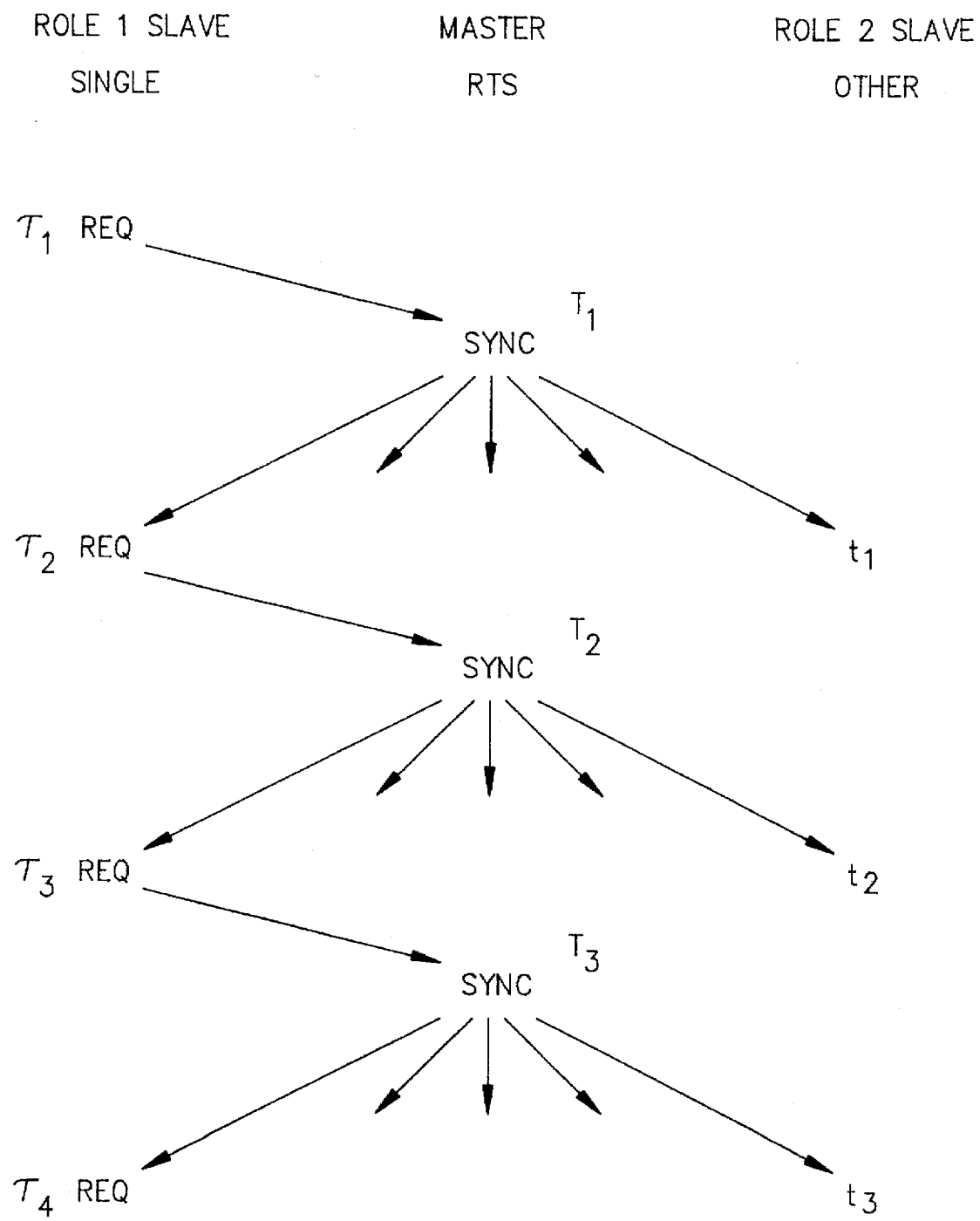
FIG. 2 is a timing diagram showing the message exchange between the reference time source and the single node responsible for supporting the standard handshaking protocol according to PCS, and another node receiving the broadcast messages.

FIG. 2 is a timing diagram which shows the sequence of messages which are exchanged between various nodes of a network in accordance with the invention. In FIG. 2, time moves forward from top to bottom. Three network devices are identified, and represented as left, middle, and right columns of the diagram. The middle column is the reference time source, and is labeled RTS. The left column is a single one of the nodes which plays the first role, i.e., engages in the standard PCS message exchange protocol with the RTS. The right column, labeled "other," represents an arbitrary number of other nodes which play the second role, i.e., which receive broadcast synchronization messages from the RTS, but do not send messages.

For each device, messages which it sends are shown as arrows sloping downward away from its column, and messages which it receives are shown as arrows sloping downward toward its column. Accordingly, each of the synchronization messages broadcast by the RTS is shown as a group of arrows sloping downward in all directions, both to the single node and to the other node, and elsewhere on the network. Messages sent from the first role slave node are also available to all nodes on the network. However, for clarity of explanation of how the method of the invention works, the synchronization request messages are shown as only going to the RTS.

The points in time at which messages are sent or received are marked according to three time scales. The time scale of the RTS is represented by the times $T_1$, $T_2$, and $T_3$. The time scale of the first role slave node is represented by the times $\tau_1$, $\tau_2$, and $\tau_3$. The time scale of the second role slave node is represented by the times $t_1$, $t_2$, and $t_3$.

The messages exchanged between the first role slave node and the RTS will be described first. The reception of the broadcast messages by the second role slave node will be described afterward.

In accordance with the PCS protocol, at time $\tau_1$ according to its time scale, the first role node detected that its internal clock had drifted beyond a predetermined threshold of accuracy. The first role node thus sent a synchronization request messages directed to the RTS. At time $T_1$ according to the reference time, the RTS received the first role slave node's request, and responded with a broadcast synchronization message bearing the reference time stamp $T_1$ according to its reference time scale.

At time $\tau_2$ according to its local time scale, the first role slave node received the synchronization message. The first role slave node then had two local times, $\tau_1$ and $\tau_2$, between which fell the received reference time $T_1$. Accordingly, the first role slave node can synchronize itself by adjusting its local time to compensate for a difference between $T_1$ and a time related to, preferably halfway between, its two local times $\tau_1$ and $\tau_2$.

Conventionally, the first role slave node could either (i) perform this exchange further times to attempt to obtain two local times closer together for greater accuracy, (ii) perform this exchange further times to obtain two reference times, such as $T_1$ and $T_2$, between which falls one of its local times, e.g. $\tau_2$, or (iii) simply synchronize itself and go no further.

However, in accordance with the invention, the above-described message exchange is performed at least twice. The number of times it is performed is determined by the predetermined protocol of the network, specifically, by the maximum number k of messages that can be in transit at any given time. This will be discussed in detail in connection with the upcoming discussion of the messages received by the other node. In FIG. 2, three such message exchanges are shown. The first role slave node sends respective requests at its times $\tau_2$ and $\tau_3$. Respective synchronization messages are sent from the RTS at reference times $T_2$ and $T_3$, and are received by the first role slave node at its local times $\tau_3$ and $\tau_4$.

The first role slave node thus has three pairs of local times between which fall a reference time, and two pairs of reference times between which fall a local time. The first role slave node can use any of these pairs, and the intervening time according to the other time scale, to synchronize itself.

ANONYMOUS SYNCHRONIZATION OF SLAVE NODES PLAYING THE SECOND ROLE

Let us now consider the receipt of the messages by the second role slave node, at times $t_1$, $t_2$, and $t_3$.

Broadly stated, the operation of the second role node is predicated on a predetermined protocol in which a burst of synchronization messages is sent, there being a known upper bound k on the number of messages which can be in transit at any given time. In the preferred embodiment, k=1. Preferably, "in transit" is taken to mean either in a receive buffer, literally in transit through the network, or generated and time stamped but not yet literally placed in transit.

The number of time synchronization messages sent in the burst exceeds k. Again, in the preferred embodiment, where k=1, two messages are sufficient, although a greater number may also be used.

A local time stamp mark is inserted after at least one, and preferably each, of the messages in the burst. While the first few messages of the burst may be detected in the node's received buffer and processed concurrently, in accordance with the invention at least one of the messages within the burst is time stamped soon enough after being received that the next message of the burst is not yet received, i.e., the receive buffer is empty following receipt and extraction of the at least one synchronization message. The local time corresponding to this time stamp is used for comparison with the reference times in the synchronization messages.

The local time stamp marks in the storage buffer are checked, to locate and select one which was produced at a time at which no remaining messages were in the node's receive buffer. Reference times provided in the most recent synchronization message prior to the selected local time stamp mark and in the (k+1)th synchronization message following the selected local time stamp mark are read. Since the value of k is known. k preferably equalling 1, and it is known that the synchronization messages were sent in a burst, it is conclusively determined that the selected local time stamp mark was made at a time between the reference times within the two synchronization messages.

A reference time corresponding to the local time stamp mark is then calculated in terms of those two reference times. The local time stamp mark is then compared with the calculated reference time. The difference between these two times is the degree to which the local time differs from the reference time produced by the external source. Accordingly, the local time is adjusted to compensate for that degree of difference.

Figure 3:
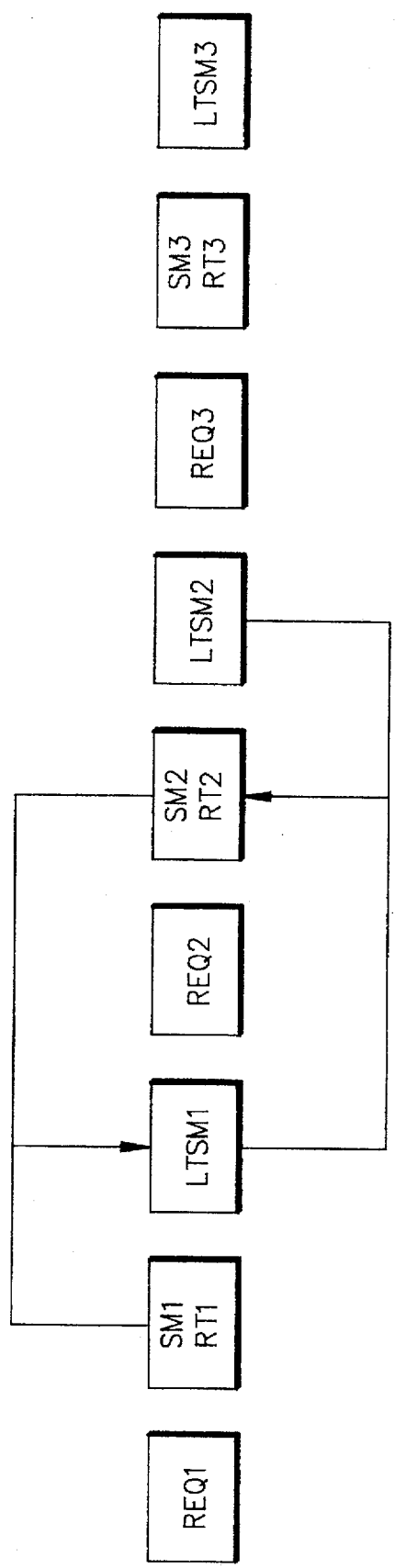
FIG. 3 is a snapshot of a storage buffer of a node which is executing a time synchronization method in accordance with the invention.

FIG. 3 is a snapshot of a storage buffer of a typical slave node playing the second role, containing synchronization messages broadcast from the RTS and received by the node. Local time stamp marks are buffered along with the received synchronization messages. Time moves forward from left to right, i.e., buffered items farther to the right are more recently received or generated. Those buffered items for which the appropriate temporal relationships are established are connected by lines.

As stated above, the detailed description of the invention will focus on a preferred embodiment in which a local time, given by a local time stamp mark, is determined to be between two reference times, contained within two synchronization messages. However, it will be understood that, if one reference time is determined to be between two local times given by two local time stamp marks, the same analysis applies.

For the purpose of this illustration, the synchronization messages and the local time stamp marks are identified by consecutive integers. However, it is understood that in practice the messages and marks contain reference time stamps according to the reference time used by the master node for slave node synchronization, and local time stamp marks according to the local time maintained by the slave node, respectively, and that these times may be any suitable actual or logical time. If the local time and the reference time operate according to two different time scales, such as two different logical times, it is understood that suitable conversions are made.

The request messages are shown as "REQ1," "REQ2," etc. Synchronization messages transmitted by the master node are designated "SM1", etc. Each message SMn contains a reference time stamp RTn, representing a reference time at which the message was sent by the master node. Local time stamp marks buffered by the second role slave node are designated "LTSM1", etc. Each local time stamp mark LTSMn is that assigned to the message at the time it was read from the second role slave node's receive buffer.

In a preferred embodiment of the invention, a local time stamp mark is assigned to a message when, immediately after the message is read from the buffer, the buffer is empty. This is preferred because of the need to establish a chronological relationship such as that in which the local time stamp mark falls between the reference time stamp of the synchronization message just read, and the reference time stamp of some subsequent synchronization message. Given a protocol in which only one message at a time is in transit over the network, the chronological relationship is established as follows: When a message is read out of the buffer, and the buffer is then empty, the second message subsequently to be received has not yet been sent, because the first subsequent message is still in transit. Thus, a reference time stamp in the second subsequent message must be later in time than the local time stamp mark associated with the message just read. Since the reference time stamp in the message just read is earlier than the local time stamp mark assigned to the message as it is read, it is established that the local time stamp mark falls between the reference time stamps of the message just read and the second subsequent message.

With the above in mind, it will be seen that there will not always be a 1-to-1 relationship between synchronization messages and local time stamp marks, as shown in FIG. 3. For instance, if several synchronization messages are waiting in the buffer when the local time stamp marking routine reads them from the buffer, only the latest synchronization message will get a local time stamp mark. If an earlier synchronization message were marked, it would be necessary to discard all subsequent messages or keep track of which subsequent messages were present as of the time the earlier message was marked, so that it can be determined which subsequently received message was not yet in existence as of the time of the marking. While doing so could still establish the necessary chronological relationship of the local time stamp mark falling between two reference time stamps, the interval between the two reference time stamps would be larger, and the accuracy of the synchronization would not be as good as if the two reference time stamps were from consecutive synchronization messages.

Turning now to the example shown in FIG. 3, a synchronization request message REQ1 is transmitted by a first role node. This message is directed to the reference time source, not to the second role node whose buffer is illustrated in FIG. 3, so in actual operation REQ1 would not necessarily appear in the second role node's buffer. However, it is shown here to illustrate the temporal relationships.

In response, a synchronization message SM1 is transmitted by the master node. The second role slave node receives the synchronization message SM1 in its receive buffer, and saves it, along with a local time stamp mark LTSM1. Then, a synchronization request message REQ2 is transmitted by the first role node. In response, a synchronization message SM2 is transmitted by the master node. The second role slave node receives the synchronization message SM2 in its receive buffer, and saves it, along with a local time stamp mark LTSM2.

Either one local time stamp mark and two reference time stamps, or one reference time stamp and two local time stamp marks, may be used as the three times having the temporal relationship. The former case will he described first.

The second role slave node selects the first local time stamp mark which was made after a received message was read from the receive buffer, leaving the receive buffer empty. This is the mark LTSM1 following SM1. Thus, at the time this mark was made, the next synchronization request REQ2 may already be in transit, but the following message SM2 is not yet transmitted. Thus, it is established that the local time given by the mark LTSM1 falls between the reference times RT1 and RT2. These two reference times are used as described above to estimate a reference time corresponding with the local time LTSM1, and the local time is adjusted as described above. If, for any reason, synchronization cannot be realized from these three times, a similar temporal relationship is established between RT2, LTSM2, and RT3.

In the latter case, the synchronization message SM2, which contains the reference time stamp RT2, is selected as the first time. The local time stamp mark LTSM2, or any subsequent local time stamp mark, then can serve as the third time, because these times are known to be subsequent to RT2. The local time stamp mark LTSM1, which was used to mark the earlier message SM1, must pre-date RT2. Therefore, the three times LTSM1, RT2, and LTSM2 have the specified temporal relationship. Again, if for any reason synchronization is not established, a temporal relationship is then established between the times LTSM2, RT3, and LTSM3 as described here.

DETAILED DESCRIPTION OF PREFERRED IMPLEMENTATION

Figure 4:
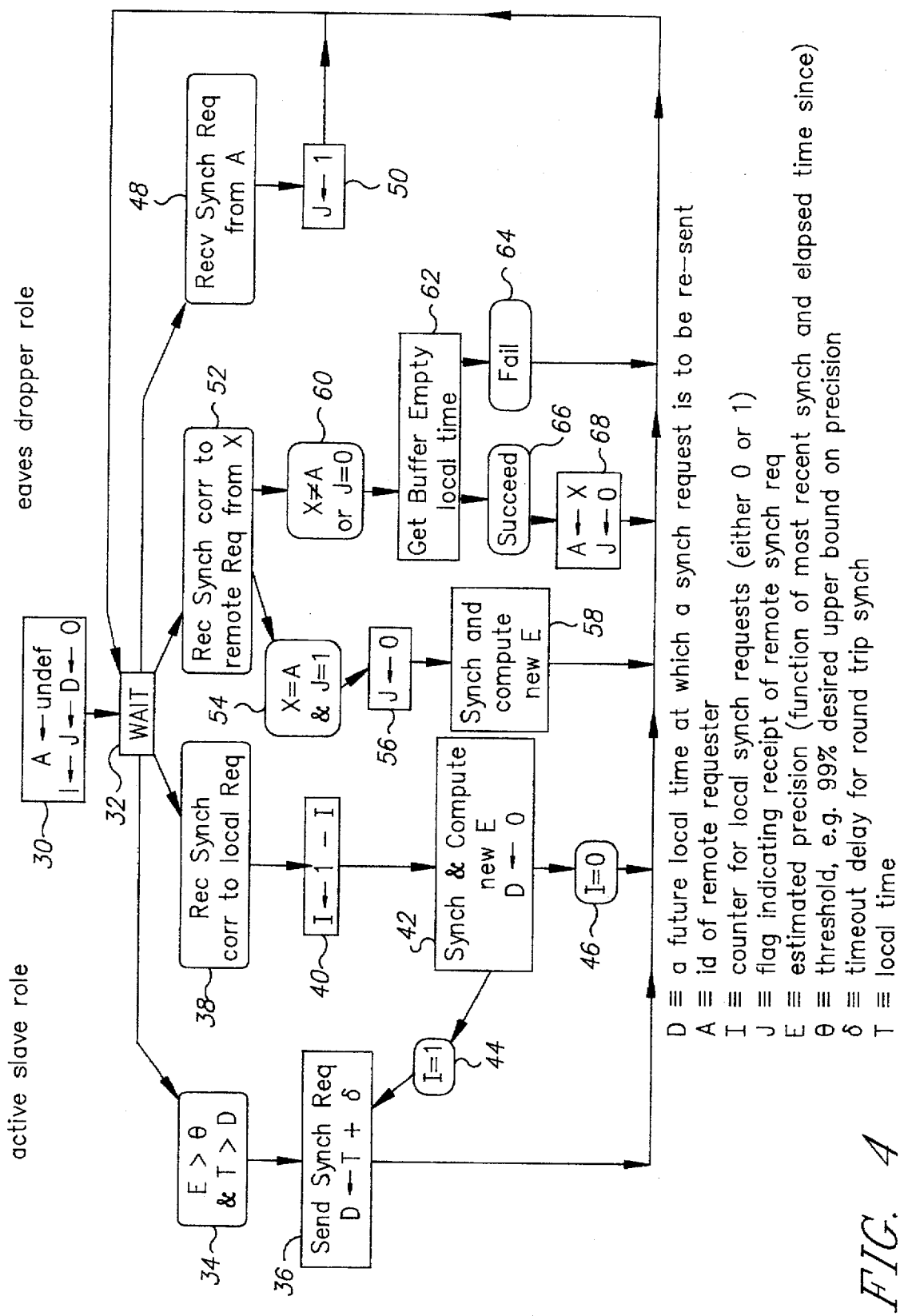
FIG. 4 is a flowchart showing a preferred implementation of the method of the invention.

FIG. 4 is a detailed flowchart of a preferred implementation of the method of the invention. The flowchart has been made up using flags and variables such as would be used by a programmer preparing a software implementation of the method of the invention for execution on a processor node functioning in a communication network. For the reader's convenience, concise definitions of the flags and variables are reproduced as part of FIG. 4.

Step 30 is an initialization step, in which the flags and variables are pre-set. A, a variable which stores the identity of a node of the network which is in the process of requesting synchronization, is initially undefined. 1, a counter for counting the number of local synchronization request messages, is initially zero. J, a flag indicating that a remote synchronization request has been received, is initially zero. D, a timeout value used for sending synchronization requests, is initially set to zero. Following initialization, the processor executes tasks unrelated to the invention, or waits, until one of two events takes place.

One of the two possible events is shown in step 34. The estimated local precision, which has been gradually increasing as time passes since the last synchronization to reflect the clock drift error, crosses a threshold value Θ. This event triggers a synchronization request. However, to prevent this event from triggering continuously thereafter, step 34 also includes a check for whether the current local time T has exceeded the timeout value D. Initially, in step 30, D is set to zero to make sure the event is immediately detected in step 34 after initialization, unless some procedure outside the scope of the invention is used to initially synchronize the node's local time.

When this first event is detected, step 36 sends a synchronization request message. Also, it stores in the timeout variable D a value equal to the current local time T, plus a waiting period δ. If the waiting period elapses before a synchronization message is received, T will again be greater than D, and the event of step 34 will occur again. This will cause the node to send another request.

After step 36 is executed, the node returns to step 32, and resumes waiting.

In due course, the node receives a response to its synchronization request message from the reference time source. This message is detected in step 38. In step 40, the counter I is changed in value to reflect the receipt of the synchronization message. In the preferred embodiment of the invention, in which k=1, it is only necessary for the node to request two synchronization messages. Thus, for this embodiment it is computationally convenient to execute step 40 as I=1-I. I, in effect, toggles between 0 and 1. However, in alternative embodiments in which a larger number of messages may be in transit on the network at the same time, i.e., if k has a greater value, the node may need to request a suitably greater number of synchronization messages. In that situation, step 40 would increment I.

Afterward, in step 42, the node synchronizes itself, preferably using standard PCS.

Next, a test is made. The test determines whether the necessary number of synchronization requests have yet been sent. In the preferred embodiment for k=1, I has the value 1, at this point, if another request message is needed. Thus, step 44, which checks that I=1, directs the node to step 36, to send another request. On the other hand, if the second request has already been sent, and a second synchronization message has been received, then step 40 has been executed a second time, and has toggled I back to 0. This condition is detected by step 46. Thus, the tasks executed by the node in its role as an active slave are complete, and the node returns to step 32.

If k has a value greater than 1, step 40 increments I, rather than toggling it. Step 44 tests for a condition where I has not yet been incremented enough times to equal k. On the other hand, step 46 determines that I does equal k. In this alternative implementation of the method of the invention, step 46 would be followed with a step which sets I back to zero.

The second possible event is shown in step 48. In the second event, a synchronization request from another node is received prior to a time when the node's error E exceeds the threshold Θ. The identity of the node which originated the message is assigned to the variable A, which had been undefined prior to receipt of a request. The remote synch request flag J is set in step 50, and the node resumes waiting at step 32.

At some time later, the master node responds with a synchronization message, directed to a remote node X. Since this message is broadcast over the network, as was the request message, the node whose execution of the method of FIG. 4 is being described also receives the synchronization message. This takes place in step 52. It should be noted, parenthetically, that it is possible that the node could have received this message without having received the request from the node A. However, it is contemplated that the invention will normally be practiced in a network environment in which any node receives network traffic, even if it is not directed to that node.

After receipt of the synchronization message in step 52, a test is made. The test has to do with the identity of the intended recipient of the synchronization message, and whether a request had previously been sent. Normally, the intended recipient X of the synchronization message should be the same node A as that which sent the request. Also, if the synchronization message was sent following a request message which was received in step 48, then the J flag should have been set in step 50. Therefore, normally, both of the conditions tested for in step 54, X=A, and J=1, should be met.

If these two conditions are both met, then the J flag is cleared in step 54, and the node proceeds to resynchronize itself based on messages in its buffer, as described above, and in the co-pending Dolev et al. application. Following this synchronization, which is shown in step 58, the node resumes waiting at step 32.

On the other hand, it may be that either the node did not receive the request message, or the synchronization message received was directed to a node other than one from which a request message had been received. Step 60 tests for either of these two conditions. These conditions indicate that further confirmation should be made that the required temporal relationships between messages and time stamps exist.

As described in Dolev et al., when a first message is read out of a node's receive buffer, and that buffer thereby becomes empty, it is confirmed that the predetermined protocol, which limits the number of messages that can be in transit as of that time, is in effect. Messages received thereafter are counted until a sufficient number of subsequent messages has been received to ensure that the latest messages was sent after the first message.

Similarly, in the present situation, where a synchronization message was received but no corresponding request message is in hand, the method includes obtaining a local time at which the buffer is empty, i.e., after all messages have been read out. If there are not sufficient messages and time stamps to establish the required temporal relationships, then the synchronization attempt fails (step 64), and the node resumes waiting. If, on the other hand, there are sufficient messages and time stamps (step 66), then the node can use the information received thus far in a future synchronization attempt. The remote requestor ID A is set to X, the identity of the node to which the message was directed, in step 68. Also, the J flag is cleared, indicating that there is not a synchronization message pending, in response to a request that has been received. Finally, the node resumes waiting at step 32.

Alternatives

In this embodiment of the invention, it may be said that k=1. Thus, two sequential LTSMs or RTs can be used as the second and third times according to the one time scale. Earlier second times and later third times may be identified similarly, although the resulting larger intervals between the second and third times bring about larger error bounds.

Also, depending on the type of predetermined protocol used, it may be possible to establish with probability, rather than certainty, that a given first time falls between second and third times. Whether such an alternative method can desirably be used depends on factors such as the type of network used. For instance, in a token-type network such as a token ring network, it is possible that two messages, such as a synchronization message and the next request, might be simultaneously in transit in different parts of the network. Thus, the likelihood that the temporal relationship between three messages, such as RT1, LTSM1, and RT2, does not hold is increased. On the other hand, in a network such as Ethernet, only one message is in transit at a time. Therefore, these three times can be used with greater likelihood that the temporal relationship holds. Therefore, the smaller window results in a synchronization with a smaller error bound.

SUMMARY

In summary, the time synchronization method in accordance with the invention permits nodes in complex network architectures to synchronize themselves with the reference time source anonymously. It is not necessary for nodes to have detailed information about network architecture or the identities of other nodes. The node which plays the first role engages in a straightforward PCS or equivalent handshaking exchange with the reference time source, thereby eliminating the need for any specialized synchronization protocol which would otherwise be necessary for anonymous operation.

A node playing the second role receives broadcast synchronization messages and synchronizes itself without acknowledging the messages. Therefore, it is possible for a node to synchronize itself without revealing its identity to any other node. The synchronization is made with a known upper bound of inaccuracy.

A node practicing the method of the invention can play either the first or the second role. A node normally defaults to the second role, but assumes the first role if its local synchronization error exceeds a threshold value.

Also, since time synchronization is made relative to a local time stamp mark which is known to have been made between the reference times given in two reference time stamps, processing delay causes no increase in the upper bound of imprecision of the resulting time synchronization. Thus, a time synchronization method in accordance with the invention provides advantageous improvement in accuracy of synchronization. A system according to the invention is decentralized, i.e., there is no dependence on a single or fixed master node.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. For use with a communication network including a plurality of nodes which maintain respective local time scales and a reference time source which maintains a reference time scale, a method for synchronizing a local time scale of one of the nodes with the reference time scale comprising the steps of:

synchronizing based on a first procedure responsive to a first event, the first procedure including synchronizing according to a protocol in which the node is known to the reference time source; and synchronizing based on a second procedure responsive to a second event the second procedure including synchronizing according to a protocol in which the node is anonymous to the reference time source.

2. A method as recited in claim 1, wherein:

the method further comprises the step of maintaining a synchronization error value; and the first event includes detection, by the node, that the synchronization error value has exceeded a threshold error value.

3. A method as recited in claim 1, wherein the step of synchronizing based on the first procedure includes:

transmitting a first synchronization request message to the reference time source;

receiving a first synchronization message from the reference time source, in response to the first request message;

transmitting a second synchronization request message to the reference time source following receipt of the first synchronization message; and receiving a second synchronization message from the reference time source, in response to the second request message.

4. A method as recited in claim 3 wherein:

the first and second synchronization messages each contain a respective reference time stamp giving a time, according to the reference time scale, related to the time of creation and broadcast of the respective synchronization message; and the step of synchronizing based on the first procedure further includes synchronizing using a probabilistic clock synchronization technique based on temporal relationships between times including at least some of (i) a local time at which one of the synchronization request messages was sent, (ii) a reference time given in one of the reference time stamps, and (iii) a time of reception of one of the synchronization message broadcast responsive to the one synchronization request message.

5. A method as recited in claim 1, wherein the second event includes receipt of a message which is part of a synchronization procedure between the reference time source and another node.

6. A method as recited in claim 5, wherein the second event includes receipt of one of:

a broadcast synchronization request message from the other node, and a broadcast synchronization message from the reference time source.

7. A method as recited in claim 5, wherein the step of synchronizing based on the second procedure includes the steps of:

establishing a temporal relationship between a time according to the reference time scale and a time according to the local time scale; and adjusting the local time scale in accordance with the temporal relationship.

8. A method as recited in claim 7, wherein the step of establishing includes:

marking received messages with local time stamp marks related to times, according to the local time scale, at which the messages were received;

extracting reference time stamps from received synchronization messages, the reference time stamps giving times, according to the reference time scale, related to times at which the synchronization messages were created and broadcast; and determining, based on a predetermined protocol which limits the number of messages in transit through the network at any given time, one of the following temporal relationships:

(i) that a given time, defined by a given one of the reference time stamps, falls between first and second times defined by first and second ones of the local time stamp marks; and (ii) that a given time, defined by a given one of the local time stamp marks, falls between first and second times defined by first and second ones of the reference time stamps.

9. A method as recited in claim 8, wherein the step or adjusting includes:

determining a difference between the given time and a time related to the first and second times; and updating the local time scale to compensate for the difference between the first time and the time related to the second and third times.

10. A communication and processing node, for use as a node with a communication network including a plurality of nodes which maintain respective local time scales and a reference time source which maintains a reference time scale, the node comprising:

means for synchronizing its local time scale with the reference time scale based on a first procedure responsive to a first event, the first procedure including synchronizing according to a protocol in which the node is known to the reference time source; and means for synchronizing its local time scale with the reference time scale based on a second procedure responsive to a second event, the second procedure including synchronizing according to a protocol in which the node is anonymous to the reference time source.

11. A node as recited in claim 10, wherein:

the node further comprises means for maintaining a synchronization error value; and the first event includes detection, by the node, that the synchronization error value has exceeded a threshold error value.

12. A node as recited in claim 10, wherein the means for synchronizing based on the first procedure includes:

means for transmitting a first synchronization request message to the reference time source;

means for receiving a first synchronization message from the reference time source, in response to the first request message;

means for transmitting a second synchronization request message to the reference time source following receipt of the first synchronization message; and means for receiving a second synchronization message from the reference time source, in response to the second request message.

13. A node as recited in claim 12 wherein:

the first and second synchronization messages each contain a respective reference time stamp giving a time, according to the reference time scale, related to the time of creation and broadcast of the respective synchronization message; and the means for synchronizing based on the first procedure further includes means for synchronizing using a probabilistic clock synchronization technique based on temporal relationships between times including at least some of (i) a local time at which one of the synchronization request messages was sent, (ii) a reference time given in one of the reference time stamps, and (iii) a time of reception of one of the synchronization message broadcast responsive to the one synchronization request message.

14. A node as recited in claim 10, wherein the second event includes receipt of a message which is part of a synchronization procedure between the reference time source and another node.

15. A node as recited in claim 14, wherein the second event includes receipt of one of:

a broadcast synchronization request message from the other node, and a broadcast synchronization message from the reference time source.

16. A node as recited in claim 14, wherein the means for synchronizing based on the second procedure includes:

means for establishing a temporal relationship between a time according to the reference time scale and a time according to the local time scale; and means for adjusting the local time scale in accordance with the temporal relationship.

17. A node as recited in claim 16, wherein the means for establishing includes:

means for marking received messages with local time stamp marks related to times, according to the local time scale, at which the messages were received;

means for extracting reference time stamps from received synchronization messages, the reference time stamps giving times, according to the reference time scale, related to times at which the synchronization messages were created and broadcast; and means for determining, based on a predetermined protocol which limits the number of messages in transit through the network at any given time, one of the following temporal relationships:

(i) that a given time, defined by a given one of the reference time stamps, falls between first and second times defined by first and second ones of the local time stamp marks; and (ii) that a given time, defined by a given one of the local time stamp marks, falls between first and second times defined by first and second ones of the reference time stamps.

18. A node as recited in claim 17, wherein the means for adjusting includes:

means for determining a difference between the given time and a time related to the first and second times; and means for updating the local time scale to compensate for the difference between the first time and the time related to the second and third times.

19. A communication network comprising:

a reference time source including means for maintaining a reference time scale and means for communicating through a communication medium; and a node including:

(i) means for communicating through the communication medium;

(ii) means for maintaining a local time scale, (iii) means for synchronizing its local time scale with the reference time scale based on a first procedure responsive to a first event, the first procedure including synchronizing according to a protocol in which the node is known to the reference time source; and (iv) means for synchronizing its local time scale with the reference time scale based on a second procedure responsive to a second event, the second procedure including synchronizing according to a protocol in which the node is anonymous to the reference time source.

20. A network as recited in claim 19, wherein:

the node further includes means for maintaining a synchronization error value; and the first event includes detection, by the node, that the synchronization error value has exceeded a threshold error value.

21. A network as recited in claim 19, wherein the means for synchronizing based on the first procedure includes:

means for transmitting a first synchronization request message to the reference time source;

means for receiving a first synchronization message from the reference time source, in response to the first request message;

means for transmitting a second synchronization request message to the reference time source following receipt of the first synchronization message; and means for receiving a second synchronization message from the reference time source, in response to the second request message.

22. A network as recited in claim 19 wherein:

the first and second synchronization messages each contain a respective reference time stamp giving a time, according to the reference time scale, related to the time of creation and broadcast of the respective synchronization message; and the means for synchronizing based on the first procedure further includes means for synchronizing using a probabilistic clock synchronization technique based on temporal relationships between times including at least some of (i) a local time at which one of the synchronization request messages was sent, (ii) a reference time given in one of the reference time stamps, and (iii) a time of reception of one of the synchronization message broadcast responsive to the one synchronization request message.

23. A network as recited in claim 19, wherein the second event includes receipt of a message which is part of a synchronization procedure between the reference time source and another node.

24. A network as recited in claim 23, wherein the second event includes receipt of one of:

a broadcast synchronization request message from the other node, and a broadcast synchronization message from the reference time source.

25. A network as recited in claim 23, wherein the means for synchronizing based on the second procedure includes:

means for establishing a temporal relationship between a time according to the reference time scale and a time according to the local time scale; and means for adjusting the local time scale in accordance with the temporal relationship.

26. A network as recited in claim 25, wherein the means for establishing includes:

means for marking received messages with local time stamp marks related to times, according to the local time scale, at which the messages were received;

means for extracting reference time stamps from received synchronization messages, the reference time stamps giving times, according to the reference time scale, related to times at which the synchronization messages were created and broadcast; and means for determining, based on a predetermined protocol which limits the number of messages in transit through the network at any given time, one of the following temporal relationships:

(i) that a given time, defined by a given one of the reference time stamps, falls between first and second times defined by first and second ones of the local time stamp marks; and (ii) that a given time, defined by a given one of the local time stamp marks, falls between first and second times defined by first and second ones of the reference time stamps.

27. A network as recited in claim 26, wherein the means for adjusting includes:

means for determining a difference between the given time and a time related to the first and second times; and means for updating the local time scale to compensate for the difference between the first time and the time related to the second and third times.

28. A computer program product, for use with a node of a communication network including a plurality of nodes which maintain respective local time scales and a reference time source which maintains a reference time scale, to facilitate the synchronization of a local time scale of the node with the reference time scale, the computer program product comprising:

a recording medium;

means, recorded on the recording medium, for directing the node to synchronize based on a first procedure responsive to a first event, the first procedure including synchronizing according to a protocol in which the one node is known to the reference time source; and means, recorded on the recording medium, for directing the node to synchronize based on a second procedure responsive to a second event, the second procedure including synchronizing according to a protocol in which the one node is anonymous to the reference time source.

29. A computer program product as recited in claim 28, wherein:

the computer program product further comprises means, recorded on the recording medium, for directing the node to maintain a synchronization error value; and the first event includes detection, by the one node, that the synchronization error value has exceeded a threshold error value.

30. A computer program product as recited in claim 28, wherein the means for directing to synchronize based on the first procedure includes:

means, recorded on the recording medium, for directing the node to transmit a first synchronization request message to the reference time source;

means, recorded on the recording medium, for directing the node to receive a first synchronization message from the reference time source, in response to the first request message;

means, recorded on the recording medium, for directing the node to transmit a second synchronization request message to the reference time source following receipt of the first synchronization message; and means, recorded on the recording medium, for directing the node to receive a second synchronization message from the reference time source, in response to the second request message.

31. A computer program product as recited in claim 30 wherein:

the first and second synchronization messages each contain a respective reference time stamp giving a time, according to the reference time scale, related to the time of creation and broadcast of the respective synchronization message; and the means for directing to synchronize based on the first procedure further includes means, recorded on the recording medium, for directing the node to synchronize using a probabilistic clock synchronization technique based on temporal relationships between times including at least some of (i) a local time at which one of the synchronization request messages was sent, (ii) a reference time given in one of the reference time stamps, and (iii) a time of reception of one of the synchronization message broadcast responsive to the one synchronization request message.

32. A computer program product as recited in claim 28, wherein the second event includes receipt of a message which is part of a synchronization procedure between the reference time source and another node.

33. A computer program product as recited in claim 32, wherein the second event includes receipt of one of:

a broadcast synchronization request message from the other node, and a broadcast synchronization message from the reference time source.

34. A computer program product as recited in claim 32, wherein the means for directing to synchronize based on the second procedure includes:

means, recorded on the recording medium, for directing the node to establish a temporal relationship between a time according to the reference time scale and a time according to the local time scale; and means, recorded on the recording medium, for directing the node to adjust the local time scale in accordance with the temporal relationship.

35. A computer program product as recited in claim 34, wherein the means for directing to establish includes:

means, recorded on the recording medium, for directing the node to mark a received messages with local time stamp marks related to times, according to the local time scale, at which the messages were received;

means, recorded on the recording medium, for directing the node to extract reference time stamps from received synchronization messages, the reference time stamps giving times, according to the reference time scale, related to times at which the synchronization messages were created and broadcast; and means, recorded on the recording medium, for directing the node to determine, based on a predetermined protocol which limits the number of messages in transit through the network at any given time, one of the following temporal relationships:

(i) that a given time, defined by a given one of the reference time stamps, falls between first and second times defined by first and second ones of the local time stamp marks; and (ii) that a given time, defined by a given one of the local time stamp marks, falls between first and second times defined by first and second ones of the reference time stamps.

36. A computer program product as recited in claim 35, wherein the means for directing to adjust includes:

means, recorded on the recording medium, for directing the node to determine a difference between the given time and a time related to the first and second times; and means, recorded on the recording medium, for directing the node to update the local time scale to compensate for the difference between the first time and the time related to the second and third times.

* * * * *